(12) United States Patent
Kaneko et al.

(10) Patent No.: US 9,493,694 B2
(45) Date of Patent: Nov. 15, 2016

(54) LUBRICATING OIL COMPOSITION FOR REFRIGERATING MACHINE

(75) Inventors: Masato Kaneko, Chiba (JP); Harutomo Ikeda, Chiba (JP); Tokue Sato, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 3 days.

(21) Appl. No.: 12/867,617

(22) PCT Filed: Jan. 19, 2009

(86) PCT No.: PCT/JP2009/050679
§ 371 (c)(1),
(2), (4) Date: Aug. 13, 2010

(87) PCT Pub. No.: WO2009/101840
PCT Pub. Date: Aug. 20, 2009

(65) Prior Publication Data
US 2011/0023531 A1  Feb. 3, 2011

(30) Foreign Application Priority Data

Feb. 15, 2008 (JP) ................................. 2008-035252

(51) Int. Cl.
*C09K 5/04* (2006.01)
*C10M 169/04* (2006.01)
*C10M 171/00* (2006.01)

(52) U.S. Cl.
CPC ............ *C09K 5/045* (2013.01); *C10M 169/04* (2013.01); *C10M 171/008* (2013.01); *C09K 2205/112* (2013.01); *C09K 2205/126* (2013.01); *C10M 2207/042* (2013.01); *C10M 2207/24* (2013.01); *C10M 2209/1033* (2013.01); *C10M 2209/1055* (2013.01); *C10M 2209/1075* (2013.01); *C10N 2220/00* (2013.01); *C10N 2220/021* (2013.01); *C10N 2220/022* (2013.01); *C10N 2220/302* (2013.01); *C10N 2230/02* (2013.01); *C10N 2230/08* (2013.01); *C10N 2230/10* (2013.01); *C10N 2240/30* (2013.01); *C10N 2250/18* (2013.01)

(58) Field of Classification Search
CPC .............. C10M 2209/1033; C10M 2207/042; C09K 2205/126
See application file for complete search history.

(56) References Cited

U.S. PATENT DOCUMENTS

| 4,267,064 A | 5/1981 | Sasaki et al. |
| 4,948,525 A | 8/1990 | Sasaki et al. |
| 5,454,963 A | 10/1995 | Kaneko |
| 5,605,882 A | 2/1997 | Klug et al. |
| 6,377,770 B1 * | 4/2002 | Hirose et al. ................. 399/286 |
| 7,914,697 B2 * | 3/2011 | Kaneko ............................ 252/68 |
| 2003/0089223 A1 * | 5/2003 | Sugioka et al. .................. 92/70 |
| 2004/0091884 A1 | 5/2004 | Clark et al. |
| 2004/0180796 A1 * | 9/2004 | Iwata et al. .................... 508/103 |
| 2007/0007488 A1 | 1/2007 | Singh et al. |
| 2008/0098755 A1 | 5/2008 | Singh et al. |
| 2008/0099190 A1 | 5/2008 | Singh et al. |
| 2008/0111099 A1 * | 5/2008 | Singh et al. .................... 252/67 |
| 2009/0062167 A1 | 3/2009 | Kaneko |

FOREIGN PATENT DOCUMENTS

| JP | 01 271491 | 10/1989 |
| JP | 2 43290 | 2/1990 |
| JP | 6 240278 | 8/1994 |
| JP | 07 188689 | 7/1995 |
| JP | 2007-510039 A | 4/2007 |
| JP | 2007-532766 A | 11/2007 |
| JP | 2007-532767 A | 11/2007 |
| WO | 2005 103190 | 11/2005 |
| WO | WO 2005/103187 A1 | 11/2005 |
| WO | WO 2006/069362 A2 | 6/2006 |
| WO | WO 2006/094303 A2 | 9/2006 |
| WO | 2007 002625 | 1/2007 |
| WO | WO 2007/026647 A1 | 3/2007 |
| WO | 2007 105452 | 9/2007 |
| WO | WO 2007/105452 | * 9/2007 |

OTHER PUBLICATIONS

Extended European Search Report issued Sep. 15, 2011, in Patent Application No. 09711298.1.
Japanese Office Action Issued Nov. 27, 2012 in Patent Application No. 2008-035252.

* cited by examiner

*Primary Examiner* — John Hardee
(74) *Attorney, Agent, or Firm* — Oblon, McClelland, Maier & Neustadt, L.L.P.

(57) ABSTRACT

Provided is a lubricant composition for a refrigerator having the following characteristics: the composition being used for a refrigerator using a refrigerant having a specific structure such as an unsaturated fluorinated hydrocarbon compound serving as a refrigerant having a low global warming potential and usable particularly in current air-conditioning system for cars; the composition having excellent stability as well as excellent compatibility with the refrigerant; the composition including a base oil containing a polyoxyalkylene glycol derivative as a main component and 1 to 20% by mass of a monoepoxy compound based on the total amount of the composition; and the refrigerator using a refrigerant containing at least one kind of fluorine-containing organic compound selected from compounds represented by the molecular formula (A) $C_pO_qF_rR_s$ or including a combination of the fluorine-containing organic compound and a saturated fluorinated hydrocarbon compound.

16 Claims, No Drawings

LUBRICATING OIL COMPOSITION FOR REFRIGERATING MACHINE

TECHNICAL FIELD

The present invention relates to a lubricant composition for a refrigerator and more specifically, to a lubricant composition for a refrigerator, which is used for a refrigerator using a specific refrigerant such as an unsaturated fluorinated hydrocarbon compound serving as a refrigerant having a low global warming potential and being available particularly in current air-conditioning systems for cars or the like, and which is formed by using a base oil mainly containing a polyoxyalkylene glycol derivative, has excellent stability, and suppresses the generation of sludge in a sealed tube test.

BACKGROUND ART

In general, a compression refrigerator includes at least a compressor, a condenser, an expansion mechanism (such as an expansion valve), and an evaporator, or further includes a drier, and is structured so that a mixed liquid of a refrigerant and lubricant (refrigerator oil) circulates in a closed system. In such a compression refrigerator, the temperature in the compressor is generally high, and the temperature in the condenser is generally low, though such general theory depends on the kind of such a compression refrigerator. Accordingly, the refrigerant and the lubricant must circulate in the system without undergoing phase separation in a wide temperature range from low temperature to high temperature. In general, the refrigerant and the lubricant have regions where they undergo phase separation at low temperatures and high temperatures. Moreover, the highest temperature of the region where the refrigerant and the lubricant undergo phase separation at low temperatures is preferably −10° C. or lower, or particularly preferably −20° C. or lower. On the other hand, the lowest temperature of the region where the refrigerant and the lubricant undergo phase separation at high temperatures is preferably 30° C. or higher, or particularly preferably 40° C. or higher. The occurrence of the phase separation during the operation of the refrigerator adversely affects the lifetime and efficiency of the refrigerator to a remarkable extent. For example, when the phase separation of the refrigerant and the lubricant occurs in the compressor portion, a movable part is insufficiently lubricated, with the result that baking or the like occurs to shorten the lifetime of the refrigerator remarkably. On the other hand, when the phase separation occurs in the evaporator, the lubricant having a high viscosity is present, with the result that the efficiency of heat exchange reduces.

A chlorofluorocarbon (CFC), a hydrochlorofluorocarbon (HCFC), or the like has been heretofore mainly used as a refrigerant for a refrigerator. However, such compounds each contain chlorine that is responsible for environmental issues, so investigation has been conducted on a chlorine-free alternative refrigerant such as a hydrofluorocarbon (HFC). A hydrofluorocarbon typified by, for example, 1,1,1,2-tetrafluoroethane, difluoromethane, pentafluoroethane, or 1,1,1-trifluoroethane (hereinafter, referred to as R134a, R32, R125, or R143a, respectively) has been attracting attention, and, for example, R134a has been used in an air-conditioning system for cars.

However, because the influence of the HFC is also concerned from the viewpoint of the global warming, so-called natural refrigerants such as carbon dioxide have attracted attention as alternative refrigerants more suitable for environmental protection. The carbon dioxide requires high pressure, and hence cannot be used in the current air-conditioning system for cars.

A refrigerant having a specific polar structure in the molecule such as an unsaturated fluorinated hydrocarbon compound (see, for example, Patent Document 1), a fluorinated ether compound (see, for example, Patent Document 2), a fluorinated alcohol compound, or a fluorinated ketone compound has been found as a refrigerant which has a low global warming potential and can be used in a current air-conditioning system for cars.

The lubricant for a refrigerator that uses the refrigerant is demanded to have excellent compatibility with the refrigerant and excellent stability.

Patent Document 1: Japanese Translation of PCT International Application Publication No. 2006-503961 A (WO 2004/037752 A)

Patent Document 2: Japanese Translation of PCT International Application Publication No. H07-507342 A (WO 93/24586 A)

DISCLOSURE OF THE INVENTION

Under the circumstances, an object of the present invention is to provide a lubricant composition for a refrigerator having the following characteristics: the composition being used for a refrigerator using a refrigerant having a specific structure such as an unsaturated fluorinated hydrocarbon compound serving as a refrigerant having a low global warming potential and usable particularly in current air-conditioning system for cars; and the composition having excellent stability as well as excellent compatibility with the refrigerant.

The inventors of the present invention have studied extensively to achieve the object. As a result, the inventors have found that the object can be achieved by containing an acid scavenger formed of a specific compound as well as a polyoxyalkylene glycol derivative as a base oil, and preferably using a specific material for a friction part in a refrigerator. The present invention has been completed based on findings thereof.

That is, the present invention provides:

(1) a lubricant composition for a refrigerator, comprising: a base oil containing a polyoxyalkylene glycol derivative as a main component; and 1 to 20% by mass of a monoepoxy compound based on the total amount of the composition, the refrigerator using a refrigerant containing at least one kind of fluorine-containing organic compound selected from compounds represented by the following molecular formula (A) or including a combination of the fluorine-containing organic compound and a saturated fluorinated hydrocarbon compound, $$C_pO_qF_rR_s \qquad (A)$$

wherein R represents Cl, Br, I, or H; "p" represents an integer of 1 to 6, "q" represents an integer of 0 to 2, "r" represents an integer of 1 to 14, and "s" represents an integer of 0 to 13; and provided that, when "q" represents 0, "p" represents 2 to 6, and one or more carbon-carbon unsaturated bonds are included in the molecule;

(2) the lubricant composition for a refrigerator according to the item (1), wherein the refrigerant comprises an unsaturated fluorinated hydrocarbon compound having 2 to 3 carbon atoms or a combination of a saturated fluorinated hydrocarbon compound having 1 to 3 carbon atoms and an unsaturated fluorinated hydrocarbon compound having 2 to 3 carbon atoms;

(3) the lubricant composition for a refrigerator according to the item (1) or (2), wherein the base oil has a kinematic viscosity of 2 to 50 mm²/s at 100° C.;

(4) the lubricant composition for a refrigerator according to any one of the items (1) to (3), wherein the base oil has a molecular weight of 500 or more;

(5) the lubricant composition for a refrigerator according to any one of the items (1) to (4), wherein the polyoxyalkylene glycol derivative comprises a compound represented by the general formula (I):

$$R^1-[(OR^2)_m-OR^3]n \quad (I)$$

wherein $R^1$ represents a hydrogen atom, an alkyl group having 1 to 10 carbon atoms, an acyl group having 2 to 10 carbon atoms, or an aliphatic hydrocarbon group having 2 to 6 binding sites and 1 to 10 carbon atoms; $R^2$ represents an alkylene group having 2 to 4 carbon atoms; $R^3$ represents a hydrogen atom, an alkyl group having 1 to 10 carbon atoms, or an acyl group having 2 to 10 carbon atoms; "n" represents an integer of 1 to 6; "m" represents a number with which an average value of "m×n" becomes 6 to 80; and when a plurality of $OR^2$'s are present, the plurality of $OR^2$'s may be identical to or different from each other, and when a plurality of $[(OR^2)_m-OR^3]$'s are present, the plurality of $[(OR^2)_m-OR^3]$'s may be identical to or different from each other;

(6) the lubricant composition for a refrigerator according to the item (5), wherein the polyoxyalkylene glycol derivative comprises a monool-based and/or diol-based polyoxyalkylene glycol derivative;

(7) the lubricant composition for a refrigerator according to any one of the items (1) to (6), comprising at least one kind of additive selected from an extreme pressure agent, an oiliness agent, an antioxidant, a metal deactivator, and an anti-foaming agent;

(8) the lubricant composition for a refrigerator according to any one of the items (1) to (7), wherein a friction part in the refrigerator is formed of an engineering plastic or includes an organic coating film or an inorganic coating film;

(9) the lubricant composition for a refrigerator according to the item (8), wherein the organic coating film is a polytetrafluoroethylene coating film, a polyimide coating film, a polyamideimide coating film, or a thermosetting insulating film formed from a resin coating material comprising a resin base material comprising a polyhydroxyether resin and a polysulfone-based resin, and a cross-linking agent;

(10) the lubricant composition for a refrigerator according to the item (8), wherein the inorganic coating film is a graphite film, a diamond-like carbon film, a tin film, a chromium film, a nickel film, or a molybdenum film;

(11) the lubricant composition for a refrigerator according to any one of the items (1) to (10), which is used in various hot-water supplying systems or refrigeration and heating systems for car air conditioners, electric air conditioners for cars, gas heat pumps, air conditioners, refrigerators, vending machines, or showcases; and

(12) the composition according to the item (11), wherein the water content in a system is 300 ppm by mass or less and the residual air partial pressure in the system is 10 kPa or less.

According to the present invention, there can be provided a lubricant composition for a refrigerator having the following characteristics: the composition being used for a refrigerator using a refrigerant having a specific structure such as an unsaturated fluorinated hydrocarbon compound serving as a refrigerant having a low global warming potential and usable particularly in current air-conditioning systems for cars; the composition having excellent stability as well as excellent compatibility with the refrigerant; and the composition suppressing the generation of sludge in a sealed tube test.

BEST MODE FOR CARRYING OUT THE INVENTION

The lubricant composition for a refrigerator of the present invention is a lubricant composition for a refrigerator using a refrigerant containing at least one kind of fluorine-containing organic compound selected from compounds represented by the following molecular formula (A) or including a combination of the fluorine-containing organic compound and a saturated fluorinated hydrocarbon compound, $$C_pO_qF_rR_s \quad (A)$$

wherein R represents Cl, Br, I, or H; "p" represents an integer of 1 to 6, "q" represents an integer of 0 to 2, "r" represents an integer of 1 to 14, and "s" represents an integer of 0 to 13; and provided that, when "q" represents 0, "p" represents 2 to 6 and one or more carbon-carbon unsaturated bonds are included in the molecule.

<Refrigerant>

The molecular formula (A) represents the kind and the number of the elements in the molecule. The formula (A) represents the fluorine-containing organic compound in which "p" as the number of the carbon atoms C represents 1 to 6. As long as the fluorine-containing organic compound is a fluorine-containing organic compound having 1 to 6 carbon atoms, the fluorine-containing organic compound can have physical and chemical properties required for the refrigerant, such as a boiling point, a freezing point, and an evaporative latent heat.

In the molecular formula (A), a binding form of "p" carbon atoms represented by $C_p$ includes a carbon-carbon single bond, an unsaturated bond such as a carbon-carbon double bond, and a carbon-oxygen double bond. The carbon-carbon unsaturated bond is preferably a carbon-carbon double bond from the viewpoint of stability. The number of the carbon-carbon double bond is 1 or more, or preferably 1.

In addition, in the molecular formula (A), a binding form of "q" oxygen atoms represented by $O_q$ is preferably oxygen atoms derived from ether groups, hydroxyl groups, or carbonyl groups. The number of the oxygen atoms "q" may be 2, and the case where the compound has two ether groups, hydroxyl groups, or the like is also included.

In addition, in the case where "q" represents 0 in $O_q$ and no oxygen atom is included in the molecule, "p" represents 2 to 6, and the molecule has one or more unsaturated bonds such as a carbon-carbon double bond. That is, at least one of the binding forms of "p" carbon atoms represented by; needs to be a carbon-carbon unsaturated bond.

In addition, in the molecular formula (A), R represents Cl, Br, I, or H, and may represent anyone of them. R preferably represents H because of its less possibility of destroying the ozone layer.

As described above, as the fluorine-containing organic compound represented by the molecular formula (A), an unsaturated fluorinated hydrocarbon compound, a fluorinated ether compound, a fluorinated alcohol compound, a fluorinated ketone compound, and the like are suitably exemplified.

Hereinafter, those compounds are described.

Unsaturated Fluorinated Hydrocarbon Compound

In the present invention, as the unsaturated fluorinated hydrocarbon compound used as a refrigerant for a refrigerator, there are exemplified unsaturated fluorinated hydrocarbon compounds where, in the molecular formula (A), R represents H, "p" represents 2 to 6, "q" represents 0, "r" represents 1 to 12, and "s" represents 0 to 11.

Examples of the unsaturated fluorinated hydrocarbon compounds preferably include a fluorinated compound of a straight-chain or branched-chain olefin having 2 to 6 carbon atoms and a fluorinated compound of a cyclic olefin having 4 to 6 carbon atoms.

Specific examples thereof include ethylenes having 1 to 3 fluorine atoms introduced, propenes having 1 to 5 fluorine atoms introduced, butenes having 1 to 7 fluorine atoms introduced, pentenes having 1 to 9 fluorine atoms introduced, hexenes having 1 to 11 fluorine atoms introduced, cyclobutenes having 1 to 5 fluorine atoms introduced, cyclopentenes having 1 to 7 fluorine atoms introduced, and cyclohexenes having 1 to 9 fluorine atoms introduced.

Of those unsaturated fluorinated hydrocarbon compounds, unsaturated fluorinated hydrocarbon compounds having 2 to 3 carbon atoms are preferred, including fluorinated compounds of ethylene such as trifluoroethylene and various fluorinated compounds of propene, and a fluorinated compound of propene is more preferred. Examples of the fluorinated compound of propene include various isomers of pentafluoropropene, 3,3,3-trifluoropropene, and 2,3,3,3-tetrafluoropropene, and 1,2,3,3,3-pentafluoropropene (HFC1225ye) and 2,3,3,3-tetrafluoropropene (HFC1234yf) are particularly suitable.

In the present invention, one kind of unsaturated fluorinated hydrocarbon compound may be used alone or two or more kinds thereof may be used in combination.

In addition, a combination of a saturated fluorinated hydrocarbon compound having 1 to 3 carbon atoms and an unsaturated fluorinated hydrocarbon compound having 2 to 3 carbon atoms is also suitably used.

Examples of the saturated fluorinated hydrocarbon compound having 1 to 3 carbon atoms include R32, R125, R134a, R143b, R152a, and R245fa. Of those, R32, R134a, and R152a are suitable. In the present invention, one kind of saturated fluorinated hydrocarbon compound may be used alone, or two or more kinds thereof may be used in combination.

Examples of the combination of a saturated fluorinated hydrocarbon compound having 1 to 3 carbon atoms and an unsaturated fluorinated hydrocarbon compound having 2 to 3 carbon atoms include a combination of $CH_2F_2$ (HFC32) and the HFC1225ye, a combination of $CHF_2CH_3$ (HFC152a) and the HFC1225ye, and a combination of $CF_3I$ and the HFC1234yf.

Fluorinated Ether Compound

In the present invention, as the fluorinated ether compound used as a refrigerant for a refrigerator, there are exemplified fluorinated ether compounds where, in the molecular formula (A), R represents H, "p" represents 2 to 6, "q" represents 1 or 2, "r" represents 1 to 14, and "s" represents 0 to 13.

Examples of the fluorinated ether compounds preferably include: a fluorinated compound of a chain aliphatic ether having 2 to 6 carbon atoms, 1 or 2 ether bonds, and a straight-chain or branched-chain alkyl group; and a fluorinated compound of a cyclic aliphatic ether having 3 to 6 carbon atoms and 1 or 2 ether bonds.

Examples thereof specifically include dimethyl ethers having 1 to 6 fluorine atoms introduced, methyl ethyl ethers having 1 to 8 fluorine atoms introduced, dimethoxymethanes having 1 to 8 fluorine atoms introduced, methyl propyl ethers having 1 to 10 fluorine atoms introduced, methyl butyl ethers having 1 to 12 fluorine atoms introduced, ethyl propyl ethers having 1 to 12 fluorine atoms introduced, oxetanes having 1 to 6 fluorine atoms introduced, 1,3-dioxolanes having 1 to 6 fluorine atoms introduced, and tetrahydrofurans having 1 to 8 fluorine atoms introduced.

Examples of those fluorinated ether compounds include hexafluorodimethyl ether, pentafluorodimethyl ether, bis(difluoromethyl)ether, fluoromethyl trifluoromethyl ether, trifluoromethyl methyl ether, perfluorodimethoxy methane, 1-trifluoromethoxy-1,1,2,2-tetrafluoroethane, difluoromethoxy pentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolane, various isomers of pentafluorooxetane, and various isomers of tetrafluorooxetane.

In the present invention, one kind of fluorinated ether compound may be used alone or two or more kinds thereof may be used in combination.

[Fluorinated Alcohol Compound]

In the present invention, as the fluorinated alcohol compound used as a refrigerant for a refrigerator and represented by the general formula (A), there are exemplified fluorinated alcohol compounds where, in the molecular formula (A), R represents H, "p" represents 1 to 6, "q" represents 1 or 2, "r" represents 1 to 13, and "s" represents 1 to 13.

Examples of the fluorinated alcohol compounds preferably include a fluorinated compound of a straight-chain or branched-chain aliphatic alcohol having 1 to 6 carbon atoms and 1 or 2 hydroxyl groups.

Examples thereof specifically include methyl alcohols having 1 to 3 fluorine atoms introduced, ethyl alcohols having 1 to 5 fluorine atoms introduced, propyl alcohols having 1 to 7 fluorine atoms introduced, butyl alcohols having 1 to 9 fluorine atoms introduced, pentyl alcohols having 1 to 11 fluorine atoms introduced, ethylene glycols having 1 to 4 fluorine atoms introduced, and propylene glycols having 1 to 6 fluorine atoms introduced.

Examples of those fluorinated alcohol compounds include monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, various isomers of octafluorobutyl alcohol, nonafluorobutyl alcohol, various isomers of difluoroethylene glycol, trifluoroethylene glycol, tetrafluoroethylene glycol, and further, various isomers of difluoropropylene glycol, various isomers of trifluoropropylene glycol, various isomers of tetrafluoropropylene glycol, various isomers of pentafluoropropylene glycol, a fluorinated propylene glycol such as hexafluoropropylene glycol, and a fluorinated trimethylene glycol corresponding to the fluorinated propylene glycol.

In the present invention, one kind of fluorinated alcohol compound may be used alone or two or more kinds thereof may be used in combination.

Fluorinated Ketone Compound

In the present invention, as the fluorinated ketone compound used as a refrigerant for a refrigerator, there are exemplified fluorinated ketone compounds in which, in the molecular formula (A), R represents H, "p" represents 2 to 6, "q" represents 1 or 2, "r" represents 1 to 12, and "s" represents 0 to 11.

Examples of the fluorinated ketone compounds preferably include fluorinated compounds of aliphatic ketones each having 3 to 6 carbon atoms and a straight-chain or branched-chain alkyl group.

Examples thereof specifically include acetones having 1 to 6 fluorine atoms introduced, methyl ethyl ketones having 1 to 8 fluorine atoms introduced, diethyl ketones having 1 to 10 fluorine atoms introduced, and methyl propyl ketones having 1 to 10 fluorine atoms introduced.

Examples of those fluorinated ketone compounds include hexafluorodimethyl ketone, pentafluorodimethyl ketone, bis(difluoromethyl) ketone, fluoromethyl trifluoromethyl ketone, trifluoromethyl methyl ketone, perfluoromethyl ethyl ketone, trifluoromethyl-1,1,2,2-tetrafluoroethyl ketone, difluoromethyl pentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, and difluoromethyl-2,2,2-trifluoroethyl ketone.

In the present invention, one kind of fluorinated ketone compound may be used alone or two or more kinds thereof may be used in combination.

Saturated Fluorinated Hydrocarbon Compound

The saturated fluorinated hydrocarbon compound is a refrigerant that can be mixed, as required, in at least one kind of fluorine-containing organic compound selected from the compounds represented by the above-mentioned general formula (A).

As the saturated fluorinated hydrocarbon compound, a fluorinated compound of an alkane having 1 to 4 carbon atoms is preferred and fluorinated compounds of methane or ethane having 1 or 2 carbon atoms such as trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroethane, and 1,1,1,2,2-pentafluoroethane are particularly suitable. In addition, the saturated fluorinated hydrocarbon compound may be one obtained by further halogenating the fluorinated compound of an alkane with a halogen atom other than fluorine, and trifluoroiodomethane ($CF_3I$) and the like are exemplified. One kind of saturated fluorinated hydrocarbon compound may be used alone or two or more kinds thereof may be used in combination.

In addition, the blending amount of the saturated fluorinated hydrocarbon compound is typically 30% by mass or less, preferably 20% by mass or less, or more preferably 10% by mass or less based on the total amount of the refrigerant.

As the lubricant composition for a refrigerator of the present invention (hereinafter may be referred to as refrigerator oil composition), there is used a lubricant composition for a refrigerator which uses the above-mentioned refrigerant, the composition including a base oil containing a polyoxyalkylene glycol derivative as a main component.

[Base Oil]

Examples of the polyoxyalkylene glycol derivative used as the base oil of the refrigerator oil composition of the present invention preferably include a compound represented by the general formula (I):

$$R^1-[(OR^2)_m-OR^3]_n \quad (I)$$

wherein $R^1$ represents a hydrogen atom, an alkyl group having 1 to 10 carbon atoms, an acyl group having 2 to 10 carbon atoms, or an aliphatic hydrocarbon group having 2 to 6 binding sites and 1 to 10 carbon atoms; $R^2$ represents an alkylene group having 2 to 4 carbon atoms; $R^3$ represents a hydrogen atom, an alkyl group having 1 to 10 carbon atoms, or an acyl group having 2 to 10 carbon atoms; "n" represents an integer of 1 to 6; "m" represents a number with which an average value of "m×n" becomes 6 to 80; and when a plurality of $OR^2$'s are present, the plurality of $OR^2$'s may be identical to or different from each other, and when a plurality of $[(OR^2)_m-OR^3]$'s are present, the plurality of $[(OR^2)_m-OR^3]$'s may be identical to or different from each other.

In the general formula (I), the alkyl group having 1 to 10 carbon atoms represented by each of $R^1$ and $R^3$ may be a straight-chain one, branched-chain one, or cyclic one. Specific examples of the alkyl group include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, and a cyclohexyl group. When the carbon number of the alkyl group exceeds 10, the compatibility with the refrigerant decreases and a phase separation may occur in some cases. The carbon number of the alkyl group is preferably 1 to 6.

Further, an alkyl group moiety of the acyl group having 2 to 10 carbon atoms represented by each of $R^1$ and $R^3$ may be a straight-chain one, branched-chain one, or cyclic one. Specific examples of the alkyl group moiety of the acyl group include the various groups having 1 to 9 carbon atoms which are exemplified as the specific examples of the above-mentioned alkyl group. When the carbon number of the acyl group exceeds 10, the compatibility with the refrigerant decreases and a phase separation may occur in some cases. The carbon number of the acyl group is preferably 2 to 6.

In the case where both $R^1$ and $R^3$ each represent an alkyl group or both $R^1$ and $R^3$ each represent an acyl group, $R^1$ and $R^3$ may be identical to or different from each other.

In addition, in the case where "n" represents 2 or more, a plurality of $R^3$'s in one molecule may be identical to or different from each other.

In the case where $R^1$ represents an aliphatic hydrocarbon group having 2 to 6 binding sites and 1 to 10 carbon atoms, the aliphatic hydrocarbon group may be chained or cyclic. As an aliphatic hydrocarbon group having 2 binding sites, there are exemplified an ethylene group, a propylene group, a butylene group, a pentylene group, a hexylene group, a heptylene group, an octylene group, a nonylene group, a decylene group, a cyclopentylene group, and a cyclohexylene group. Further, as an aliphatic hydrocarbon group having 2 to 6 binding sites, there are exemplified residues each obtained by removing hydroxyl groups from a polyhydric alcohol such as trimethylolpropane, glycerine, pentaerythritol, sorbitol, 1,2,3-trihydroxycyclohexane, or 1,3,5-trihydroxycyclohexane. When the carbon number of the aliphatic hydrocarbon group exceeds 10, the compatibility with the refrigerant decreases and a phase separation may occur in some cases. The carbon number is preferably 2 to 6.

$R^2$ in the general formula (I) represents an alkylene group having 2 to 4 carbon atoms, and as an oxyalkylene group as a repeating unit, there are exemplified an oxyethylene group, an oxypropylene group, and an oxybutylene group. The oxyalkylene groups in one molecule may be identical to each other, or two or more kinds of oxyalkylene groups may be contained in one molecule.

"n" in the general formula (I) represents an integer of 1 to 6, and is determined depending on the number of the binding sites of $R^1$. For example, in the case where $R^1$ represents an alkyl group or an acyl group, "n" represents 1, and in the case where $R^1$ represents an aliphatic hydrocarbon group having 2, 3, 4, 5, or 6 binding sites, "n" represents 2, 3, 4, 5, or 6, respectively. Further, "m" represents a number with which an average value of "m×n" becomes 6 to 80, and when the average value exceeds 80, compatibility decreases and oil returnability may be deteriorated, and hence, the object of the present invention may not be sufficiently achieved in some cases.

In the present invention, a monool-based polyoxyalkylene glycol derivative and a diol-based polyoxyalkylene glycol derivative are preferred as the polyoxyalkylene glycol derivative from the viewpoints of the compatibility with the refrigerant, the compatibility with an additive, and the stability of the refrigerator oil composition. Examples of the polyoxyalkylene glycol derivative include a compound represented by the general formula (II):

$$R^4\text{—}(OR^2)_a\text{—}OR^5 \quad\quad (II).$$

In the general formula (II), $R^4$ and $R^5$ each independently represent a hydrogen atom or an alkyl group having 1 to 6 carbon atoms, provided that at least one of $R^4$ and $R^5$ represents a hydrogen atom, the alkyl group having 1 to 6 carbon atoms may be any of a straight-chain alkyl group and a branched-chain alkyl group, and the alkyl group includes, for example, a methyl group, an ethyl group, an n-propyl group, an isopropyl group, various butyl groups, various pentyl groups, and various hexyl groups.

$R^2$ is the same as what was described in the general formula (I), one molecule may include oxyalkylene groups of the same kind, which are represented by $OR^2$, or may include two or more kinds of oxyalkylene groups, and "a" represents a number having an average value of 6 to 50.

Examples of the compound represented by the general formula (II) include: polyethylene glycols, and their monomethyl ether, monoethyl ether, monopropyl ether, and monobutyl ether; polypropylene glycols, and their monomethyl ether, monoethyl ether, monopropyl ether, and monobutyl ether; polyethylene-polypropylene glycol copolymers, and their monomethyl ether, monoethyl ether, monopropyl ether, and monobutyl ether; and poly(oxytetramethylene) glycols, and their monomethyl ether, monoethyl ether, monopropyl ether, and monobutyl ether.

A polyoxyalkylene glycol in which both of $R^4$ and $R^5$ represent hydrogen atoms in the general formula (II) includes a polyoxyalkylene glycol having hydroxyl groups at its both ends, which is obtained, for example, by polymerizing an alkylene oxide having 2 to 4 carbon atoms, such as ethylene oxide or propylene oxide, by using water or an alkali hydroxide as an initiator.

Meanwhile, ring-opening polymerization of tetrahydrofuran results in poly(oxytetramethylene) glycols.

Further, a monoalkyl ether of a polyoxyalkylene glycol in which one of $R^4$ and $R^5$ represents a hydrogen atom and the other represents an alkyl group in the general formula (II) can be obtained, for example, by etherifying, using an alkyl halide or the like, one of the end hydroxyl groups of the polyoxyalkylene glycol obtained by the above-mentioned method.

Further, polymerization of alkylene oxides having 2 to 4 carbon atoms using a monohydric alcohol having 1 to 6 carbon atoms or its alkali metal salt as an initiator results in a monoalkyl ether of a polyoxyalkylene glycol which has an ether bond at one end and a hydroxyl group at the other end.

In the present invention, one kind of polyoxyalkylene glycol derivative described above may be used alone as the base oil, or two or more kinds thereof may be used in combination.

In the refrigerator oil composition of the present invention, an oil containing as a main component at least one kind selected from the polyoxyalkylene glycol derivatives described above is used as the base oil. The phrase "containing as a main component" as used herein refers to containing the polyoxyalkylene glycol derivative at a ratio of 50% by mass or more. The content of the polyoxyalkylene glycol derivative in the base oil is preferably 70% by mass or more, more preferably 90% by mass or more, or still more preferably 100% by mass.

In the present invention, the kinematic viscosity of the base oil at 100° C. is preferably 2 to 50 mm$^2$/s, more preferably 3 to 40 mm$^2$/s, or still more preferably 4 to 30 mm$^2$/s. When the kinematic viscosity is 2 mm$^2$/s or more, favorable lubricity (load capacity resistance) is exhibited and sealing property is good, and when the kinematic viscosity is 50 mm$^2$/s or less, energy saving is also favorable.

Further, the molecular weight of the base oil is preferably 500 or more, more preferably 500 to 3,000, or still more preferably 600 to 2,500. The flash-point of the base oil is preferably 150° C. or higher. When the molecular weight of the base oil is 500 or more, desired properties as the refrigerator oil can be exhibited and the flash-point of the base oil can be also set to 150° C. or higher.

In the present invention, when the base oil has the above-mentioned properties, the refrigerator oil composition may include, in addition to the polyoxyalkylene glycol derivative, another base oil at 50% by mass or less, preferably 30% by mass or less, or more preferably 10% by mass or less, but the refrigerator oil composition free of another base oil is still more preferred.

As the base oil that can be used together with the polyoxyalkylene glycol derivative, there are exemplified polyvinyl ethers, a copolymer of poly(oxy)alkylene glycol or a monoether thereof and a polyvinyl ether, polyesters, polyol ester-based compounds, polycarbonates, a hydride of α-olefin oligomer, a mineral oil, an alicyclic hydrocarbon compound, and an alkylated aromatic hydrocarbon compound.

The base oil in the present invention is particularly suitable for the above-mentioned unsaturated fluorinated hydrocarbon refrigerant, but the refrigerant is poor in stability because the refrigerant has an olefin structure, and hence an acid scavenger is contained in the refrigerator oil composition of the present invention in order to improve the above-mentioned stability.

[Acid Scavenger]

In the present invention, a monoepoxy compound is used as the acid scavenger. The monoepoxy compound is a compound having one epoxy group in one molecule. A polyepoxy compound having two or more epoxy groups is poor in stability-enhancing effect, and generation of sludge is observed in a sealed tube test on the refrigerator oil composition.

Examples of the monoepoxy compound used as the acid scavenger in the present invention include: hydrocarbyl monoglycidyl ethers, hydrocarbyl monoglycidyl esters, and α-olefin oxides, each having, in total, generally 4 to 50 carbon atoms, preferably 4 to 24 carbon atoms, or more preferably 6 to 16 carbon atoms; monoglycidyl ethers of alkylene glycols each containing an optionally branched alkylene group having generally 3 to 30 carbon atoms, preferably 4 to 24 carbon atoms, or more preferably 6 to 16 carbon atoms; monoglycidyl ethers of polyoxyalkylene glycols each containing an oxyalkylene group having 2 to 4 carbon atoms; and cyclic monoolefin oxides each having generally 4 to 50 carbon atoms, preferably 4 to 24 carbon atoms, or more preferably 6 to 16 carbon atoms.

Of those monoepoxy compounds, hydrocarbyl monoglycidyl ethers and α-olefin oxides are preferred.

Examples of the hydrocarbyl groups in the hydrocarbyl monoglycidyl ethers include optionally branched alkyl, cycloalkyl, aryl, and aralkyl groups. Preferred examples of the hydrocarbyl monoglycidyl ethers include 2-ethylhexyl glycidyl ether, phenyl glycidyl ether, and dodecyl glycidyl ether. Preferred examples of the hydrocarbyl monoglycidyl esters include decyl glycidyl ester.

Preferred examples of the α-olefin oxides include an α-olefin oxide having 12 carbon atoms, an α-olefin oxide having 14 carbon atoms, and an α-olefin oxide having 16 carbon atoms.

In the present invention, one kind of monoepoxy compound described above may be used alone as the acid scavenger, or two or more kinds thereof may be used in combination. Further, the blending amount thereof is selected from the range of 1 to 20% by mass based on the total amount of the refrigerator oil composition. When the blending amount is less than 1% by mass, the stability-enhancing effect is not exerted sufficiently. On the other hand, when the blending amount is more than 20% by mass, the kinematic viscosity of the composition declines and the lubricity of the composition declines. The blending amount is preferably 1 to 15% by mass or more preferably 1.5 to 10% by mass.

Other Additives

The refrigerator oil composition of the present invention may contain at least one kind of additive selected from an extreme pressure agent, an oiliness agent, an antioxidant, a metal deactivator, and an anti-foaming agent.

(Extreme Pressure Agent)

Examples of the extreme pressure agent include phosphorus-based extreme pressure agents such as a phosphate, an acid phosphate, a phosphite, an acid phosphite, and amine salts thereof.

Of those phosphorus-based extreme pressure agents, tricresyl phosphate, trithiophenyl phosphate, tri(nonylphenyl) phosphite, dioleyl hydrogen phosphite, 2-ethylhexyldiphenyl phosphite, or the like is particularly preferred in terms of an extreme pressure property, frictional characteristic, and the like.

In addition, examples of the extreme pressure agent include metal salts of carboxylic acids. The term "metal salts of carboxylic acids" as used herein preferably refers to metal salts of carboxylic acids each having 3 to 60 carbon atoms, and, further, metal salts of aliphatic acids each having 3 to 30 carbon atoms, and particularly preferably 12 to 30 carbon atoms. Examples thereof further include metal salts of: dimer acids and trimer acids of the aliphatic acids; and dicarboxylic acids each having 3 to 30 carbon atoms. Of those, metal salts of aliphatic acids each having 12 to 30 carbon atoms or of dicarboxylic acids having 3 to 30 carbon atoms are particularly preferred.

On the other hand, a metal of which any such metal salt is constituted is preferably an alkali metal or an alkaline earth metal, and, in particular, is most suitably an alkali metal.

Further, examples of the extreme pressure agents other than those mentioned above include sulfur-based extreme pressure agents such as sulfurized fat, sulfurized aliphatic acid, sulfurized ester, sulfurized olefin, dihydrocarbyl polysulphide, thiocarbamates, thioterpenes, and dialkyl thiodipropionates.

The blending amount of the above-mentioned extreme pressure agent is in the range of generally 0.001 to 5% by mass, or particularly preferably 0.005 to 3% by mass based on the total amount of the composition in terms of lubricity and stability.

One kind of extreme pressure agent may be used alone, or two or more kinds thereof may be used in combination.

Oiliness Agent

Examples of the oiliness agent include: aliphatic saturated and unsaturated monocarboxylic acids such as stearic acid and oleic acid; polymerized fatty acids such as dimer acids and hydrogenated dimer acids; hydroxy fatty acids such as ricinoleic acid and 12-hydroxystearic acid; aliphatic saturated and unsaturated monohydric alcohols such as lauryl alcohol and oleyl alcohol; aliphatic saturated and unsaturated monoamines such as stearylamine and oleylamine; aliphatic saturated and unsaturated monocarboxylic acid amides such as lauric acid amide and oleic acid amide; and partial esters of a polyhydric alcohol such as glycerin or sorbitol, and an aliphatic saturated or unsaturated monocarboxylic acid.

One kind of oiliness agent may be used alone, or two or more kinds thereof may be used in combination. In addition, the blending amount of the oiliness agent is selected from the range of generally 0.01 to 10% by mass, or preferably 0.1 to 5% by mass based on the total amount of the composition.

Antioxidant

A phenol-based antioxidant such as 2,6-di-tert-butyl-4-methylphenol, 2,6-di-tert-butyl-4-ethylphenol, or 2,2'-methylenebis(4-methyl-6-tert-butylphenol) or an amine-based antioxidant such as phenyl-α-naphthylamine or N,N'-diphenyl-p-phenylenediamine is preferably blended as the antioxidant. The antioxidant is blended in the composition at a content of generally 0.01 to 5% by mass, or preferably 0.05 to 3% by mass in terms of an effect, economical efficiency, and the like.

Metal Deactivator and Anti-Foaming Agent

Exemplified as the metal deactivator is a copper deactivator such as N—[N,N'-dialkyl(alkyl group having 3 to 12 carbon atoms) aminomethyl]triazole. Exemplified as the anti-foaming agent are a silicone oil and a fluorinated silicone oil.

Method of Lubricating Refrigerator Using Refrigerator Oil Composition

The refrigerator oil composition of the present invention is applied to a refrigerator employing a refrigerant containing at least one kind of fluorine-containing organic compound selected from the compounds represented by the molecular formula (A) or a combination of the fluorine-containing organic compound and a saturated fluorinated hydrocarbon compound. In particular, the refrigerator oil composition is applicable to a refrigerator employing a refrigerant containing an unsaturated fluorinated hydrocarbon compound.

The used amounts of any one of the various refrigerants and the refrigerator oil composition in a method of lubricating a refrigerator using the refrigerator oil composition of the present invention are such that a mass ratio of the refrigerant to the refrigerator oil composition is in the range of preferably 99/1 to 10/90, or more preferably 95/5 to 30/70. The amount of the refrigerant below the above ranges is not preferred because a reduction in refrigerating capacity of the refrigerator is observed. In addition, the amount of the refrigerant beyond the above ranges is not preferred because the lubricity of the composition reduces. The refrigerator oil composition of the present invention, which can be used in any one of various refrigerators, is particularly preferably applicable to the compression refrigerating cycle of a compression refrigerator.

Refrigerator

The refrigerator to which the refrigerator oil composition of the present invention is applied has a refrigerating cycle having a constitution which essentially needs a compressor, a condenser, an expansion mechanism (such as an expansion valve), and an evaporator, or a compressor, a condenser, an expansion mechanism, a drier, and an evaporator, uses the above-mentioned refrigerator oil composition of the present invention as a refrigerator oil, and uses the above-mentioned various refrigerants as refrigerants.

Here, the drier is preferably filled with a desiccant formed of zeolite having a pore diameter of 0.33 nm or less. In addition, as the zeolite, a natural zeolite or a synthetic zeolite may be exemplified. Further, zeolite having a $CO_2$ gas absorbing amount of 1% or less at 25° C. and a $CO_2$ gas partial pressure of 33 kPa is more suitable. As the synthetic zeolite described above, XH-9 (trade name), XH-600 (trade name) manufactured by UNION SHOWA K.K., and the like are exemplified.

In the present invention, if the desiccant is used, moisture can be removed efficiently without absorbing of the refrigerant in the refrigerating cycle, and simultaneously, powderization of the desiccant due to deterioration of the desiccant itself is suppressed. Therefore, there is no possibility of clogging of pipes caused by the powderization or abnormal abrasion caused by entering of the powder into a friction part of the compressor, and as a result, the refrigerator can be driven stably for a long time period.

Various friction parts (such as a bearing) are present in a compressor in a refrigerator to which the refrigerator oil composition of the present invention is applied. In the present invention, a part formed of an engineering plastic, or a part having an organic coating film or inorganic coating film is used as each of the friction parts in terms of, in particular, a sealing property.

Preferred examples of the engineering plastic include a polyamide resin, a polyphenylene sulfide resin, and a polyacetal resin in terms of a sealing property, friction property, abrasion resistance, and the like.

In addition, examples of the organic coating film include a fluorine-containing resin coating film (such as a polytetrafluoroethylene coating film), a polyimide coating film, and a polyamideimide coating film in terms of a sealing property, friction property, abrasion resistance, and the like. Further, examples thereof include a thermosetting insulating film formed from a resin coating material comprising a resin base material comprising a polyhydroxyether resin and a polysulfone-based resin, and a cross-linking agent.

On the other hand, examples of the inorganic coating film include a graphite film, a diamond-like carbon film, a nickel film, a molybdenum film, a tin film, and a chromium film in terms of a sealing property, friction property, abrasion resistance, and the like. The inorganic coating film may be formed by a plating treatment, or may be formed by a physical vapor deposition method (PVD).

It should be noted that a part composed of, for example, a conventional alloy system such as an Fe base alloy, an Al base alloy, or a Cu base alloy can also be used as each of the friction parts.

[System Using Refrigerator Oil Composition]

The refrigerator oil composition of the present invention can be used for example in each of various hot-water supplying systems or refrigeration and heating systems for car air conditioners, electric air conditioners for cars, gas heat pumps, air conditioners, refrigerators, vending machines, or showcases.

In the present invention, the water content in the system is preferably 300 ppm by mass or less or more preferably 200 ppm by mass or less. In addition, the residual air amount partial pressure in the system is preferably 10 kPa or less or more preferably 5 kPa or less.

The refrigerator oil composition of the present invention mainly contains a specific oxygen-containing compound as a base oil, has so low viscosity that energy saving can be improved, and has an excellent sealing property.

EXAMPLES

Subsequently, the present invention is described in more detail by way of Examples. However, the present invention is by no means limited by the Examples.

It should be noted that properties of the base oil and various characteristics of the refrigerator oil composition were determined according to the following procedure.
<Properties of Base Oil>
(1) Kinematic Viscosity at 100° C.

The kinematic viscosity at 100° C. was measured according to JIS K2283-1983 by using a glass-made capillary viscometer.
(2) Hydroxyl Number The hydroxyl number was measured according to JIS K 0070.
(3) Molecular Weight The molecular weight was calculated according to the chemical structures of compounds constituting the base oil.
(4) Flash-Point The flash-point was measured according to JIS K 2265 (COC method).
<Various Characteristics of Refrigerator Oil Composition>
(5) Two-Phase Separation Temperature A measuring tube for two-phase separation temperature (internal volume: 10 mL) was filled with an oil (0.6 g) and a refrigerant (2.4 g) and kept in a thermostatic chamber. The temperature in the thermostatic chamber was increased from room temperature (25° C.) at a rate of 1° C./min, and a two-phase separation temperature was measured.
(6) Stability (Sealed Tube Test)

A glass tube was filled with an oil (HFC1234yf) (4 mL) and a refrigerant (1 g) (water content of 200 ppm), and metal catalysts of iron, copper, and aluminum, and sealed. After the glass tube was kept at an air pressure of 26.6 kPa at a temperature of 175° C. for 10 days, oil appearance, catalyst appearance, and the presence or absence of sludge were visually observed and the acid value was measured.

The kinds of components used in preparation of the refrigerator oil composition are described below.

As the base oil, A1 to A3 were used. Table 1 shows the compound name and properties of each base oil.

TABLE 1

| Kind of base oil | Chemical name | Hydroxyl number (mgKOH/g) | Kinematic viscosity at 100° C. (mm²/s) | Molecular weight | Flash-point (° C.) |
|---|---|---|---|---|---|
| A1 | Me—PO—OH | 56 | 10.6 | 1100 | 196 |
| A2 | HO—PO—OH | 102 | 10.5 | 990 | 192 |
| A3 | Bu—PO/EO—OH (Molar ratio of PO/EO = 5:5) | 25 | 21.7 | 1700 | 225 |

Notes
Me—PO—OH: polyoxypropylene glycol monomethyl ether
HO—PO—OH: polyoxypropylene glycol
Bu—PO/EO(5/5)—OH: polyoxypropylene-polyoxyethylene glycol copolymer monobutyl ether B1 to B3 described below were used as acid scavengers.

B1: an α-olefin oxide having 14 carbon atoms
B2: 2-ethylhexyl glycidyl ether
B3: 3,4-epoxycyclohexylmethyl(3,4-epoxy)cyclohexane carboxylate Examples 1 to 12, and Comparative Examples 1 to 9

Refrigerator oil compositions each having a composition as shown in Tables 2 were prepared, and the properties thereof were evaluated by using, as refrigerants, HFC1234yf (2,3,3,3-tetrafluoropropene). The results are shown in Tables 2.

TABLE 2

| | | | Example 1 | Example 2 | Example 3 | Example 4 | Example 5 | Example 6 |
|---|---|---|---|---|---|---|---|---|
| Blending composition (% by mass) | Base oil | A1 | 90 | — | — | 90 | — | — |
| | | A2 | — | 90 | — | — | 90 | — |
| | | A3 | — | — | 90 | — | — | 90 |
| | Acid scavenger | B1 | 10 | 10 | 10 | — | — | — |
| | | B2 | — | — | — | 10 | 10 | 10 |
| | | B3 | — | — | — | — | — | — |
| Two-phase separation temperature of HFC1234yf [oil content of 20% by mass] (° C.) | | | 20< | 20< | 20< | 20< | 20< | 20< |
| Performance evaluation | Sealed tube test | Oil appearance | Good | Good | Good | Good | Good | Good |
| | | Catalyst appearance | Good | Good | Good | Good | Good | Good |
| | | Presence or absence of sludge | Absent | Absent | Absent | Absent | Absent | Absent |
| | | Acid value (mgKOH/g) | 0.01> | 0.01> | 0.01> | 0.01> | 0.01> | 0.01> |

| | | | Example 7 | Example 8 | Example 9 | Example 10 | Example 11 | Example 12 |
|---|---|---|---|---|---|---|---|---|
| Blending composition (% by mass) | Base oil | A1 | 95 | — | — | 98 | — | — |
| | | A2 | — | 95 | — | — | 98 | — |
| | | A3 | — | — | 95 | — | — | 98 |
| | Acid scavenger | B1 | 5 | 5 | 5 | 2 | 2 | 2 |
| | | B2 | — | — | — | — | — | — |
| | | B3 | — | — | — | — | — | — |
| Two-phase separation temperature of HFC1234yf [oil content of 20% by mass] (° C.) | | | 20< | 20< | 20< | 20< | 20< | 20< |
| Performance evaluation | Sealed tube test | Oil appearance | Good | Good | Good | Good | Good | Good |
| | | Catalyst appearance | Good | Good | Good | Good | Good | Good |
| | | Presence or absence of sludge | Absent | Absent | Absent | Absent | Absent | Absent |
| | | Acid value (mgKOH/g) | 0.01> | 0.01> | 0.01> | 0.02 | 0.04 | 0.03 |

| | | | Comparative Example 1 | Comparative Example 2 | Comparative Example 3 |
|---|---|---|---|---|---|
| Blending composition (% by mass) | Base oil | A1 | 90 | — | — |
| | | A2 | — | 90 | — |
| | | A3 | — | — | 90 |

TABLE 2-continued

|  |  |  | | | |
|---|---|---|---|---|---|
| | Acid | B1 | — | — | — |
| | scavenger | B2 | — | — | — |
| | | B3 | 10 | 10 | 10 |
| Two-phase separation temperature of HFC1234yf [oil content of 20% by mass] (° C.) | | | 20< | 20< | 20< |
| Performance evaluation | Sealed tube test | Oil appearance | Good | Good | Good |
| | | Catalyst appearance | Good | Good | Good |
| | | Presence or absence of sludge | Present | Present | Present |
| | | Acid value (mgKOH/g) | 0.01> | 0.01> | 0.01> |

| | | | Comparative Example | | | | | |
|---|---|---|---|---|---|---|---|---|
| | | | 4 | 5 | 6 | 7 | 8 | 9 |
| Blending composition (% by mass) | Base oil | A1 | 99.5 | — | — | 100 | — | — |
| | | A2 | — | 99.5 | — | — | 100 | — |
| | | A3 | — | — | 99.5 | — | — | 100 |
| | Acid scavenger | B1 | 0.5 | 0.5 | 0.5 | — | — | — |
| | | B2 | — | — | — | — | — | — |
| | | B3 | — | — | — | — | — | — |
| Two-phase separation temperature of HFC1234yf [oil content of 20% by mass] (° C.) | | | 20< | 20< | 20< | 20< | 20< | 20< |
| Performance evaluation | Sealed Tube test | Oil appearance | Yellow | Yellow | Yellow | Brown | Brown | Brown |
| | | Catalyst appearance | Slight Color Change of Cu | Slight Color Change of Cu | Slight Color Change of Cu | Slight Color Change of Cu | Slight Color Change of Cu | Slight Color Change of Cu |
| | | Presence or absence of sludge | Slightly present | Slightly present | Slightly present | Slightly present | Slightly present | Slightly present |
| | | Acid value (mgKOH/g) | 0.13 | 0.23 | 0.15 | 1.2 | 2.5 | 1.4 |

Table 2 shows the following.

Each of the refrigerator oil compositions of the present invention (Examples 1 to 12) exhibits a two-phase separation temperature of higher than 20° C., and the sealed tube test results of the refrigerator oil compositions show good oil appearance and good catalyst appearance, and show no generation of sludge.

Further, the sealed tube test results of the refrigerator oil compositions of Examples 1 to 9 show that the acid values are less than 0.01 mgKOH/g. However, the sealed tube test results of the refrigerator oil compositions of Examples 10 to 12 show a slight rise in the acid values to the range of 0.02 to 0.04 mgKOH/g because the blending amount of the acid scavenger B1 is as low as 2%, by mass.

In contrast, although each of the refrigerator oil compositions of Comparative Examples 1 to 9 exhibits a two-phase separation temperature of higher than 20° C., the sealed tube test results of the refrigerator oil compositions of Comparative Examples 1 to 3 show generation of sludge because B3 (diepoxy compound) is used as the acid scavenger. Further, the refrigerator oil compositions of Comparative Examples 4 to 9 each contain only 0.5% by mass of the acid scavenger B1 or contain no acid scavenger B1, and hence the sealed tube test results show changes in oil appearance to yellow or brown, slight color changes of Cu, generation of a slight amount of sludge, and high acid values of 0.13 to 2.5 mgKOH/g.

INDUSTRIAL APPLICABILITY

The refrigerator oil composition of the present invention has the following characteristics: the composition being used for a refrigerator using a refrigerant having a specific structure such as an unsaturated fluorinated hydrocarbon compound serving as a refrigerant having a low global warming potential and usable particularly in current air-conditioning systems for cars or the like; the composition having excellent stability as well as excellent compatibility with the refrigerant; and the composition showing no generation of sludge in a sealed tube test.

The invention claimed is:

1. A composition, comprising:
   (i) a lubricant comprising (a) a base oil consisting of at least one polyoxyalkylene glycol derivative and (b) at least one monoepoxy compound selected from the group consisting of an α-olefin oxide having 12 carbon atoms, an α-olefin oxide having 14 carbon atoms and an α-olefin oxide having 16 carbon atoms, wherein the monoepoxy compound is present in an amount of 2.5 to 10% by mass, based on the total mass of the lubricant; and
   (ii) a refrigerant consisting of 2,3,3,3-tetrafluoropropene (HFC1234yf),
   wherein the polyoxyalkylene glycol derivative comprises a compound represented by the formula (I):

$$R^1-[(OR^2)_m-OR^3]_n \quad (I)$$

wherein
   $R^1$ represents a hydrogen atom, an alkyl group having 1 to 10 carbon atoms, an acyl group having 2 to 10 carbon atoms, or an aliphatic hydrocarbon group having 2 to 6 binding sites and 1 to 10 carbon atoms;

R² represents an alkylene group having 2 to 4 carbon atoms;

R³ represents a hydrogen atom, an alkyl group having 1 to 10 carbon atoms, or an acyl group having 2 to 10 carbon atoms;

n represents an integer of 1 to 6;

m represents a number with which an average value of m×n is 8 to 80; and when a plurality of OR²'s are present, the plurality of OR²'s may be identical to or different from each other, and when a plurality of $[(OR^2)_m\text{—}OR^3]$'s are present, the plurality of $[(OR^2)_m\text{—}OR^3]$'s may be identical to or different from each other.

2. The composition according to claim 1, wherein the base oil has a kinematic viscosity of 2 to 50 mm²/s at 100° C.

3. The composition according to claim 1, wherein the base oil has a molecular weight of 500 or more.

4. The composition according to claim 1, wherein the polyoxyalkylene glycol derivative comprises a monool-based and/or diol-based polyoxyalkylene glycol derivative.

5. The composition according to claim 1, further comprising at least one additive selected from the group consisting of an extreme pressure agent, an oiliness agent, an antioxidant, a metal deactivator, and an anti-foaming agent.

6. The composition according to claim 1, wherein the mass ratio of the refrigerant to the lubricant is 99/1 to 10/90.

7. The composition according to claim 1, wherein the mass ratio of the refrigerant to the lubricant is 95/5 to 30/70.

8. The composition according to claim 1, wherein the monoepoxy compound is an α-olefin oxide having 12 carbon atoms.

9. The composition according to claim 1, wherein the monoepoxy compound is an α-olefin oxide having 14 carbon atoms.

10. The composition according to claim 1, wherein the monoepoxy compound is an α-olefin oxide having 16 carbon atoms.

11. A refrigerator comprising the composition according to claim 1, wherein the refrigerator contains a friction part formed of an engineering plastic or comprises an organic coating film or an inorganic coating film.

12. The refrigerator according to claim 11, wherein the organic coating film is a polytetrafluoroethylene coating film, a polyimide coating film, a polyamideimide coating film, or a thermosetting insulating film formed from a resin coating material comprising a resin base material comprising a polyhydroxyether resin and a polysulfone-based resin, and a cross-linking agent.

13. The refrigerator according to claim 11, wherein the inorganic coating film is a graphite film, a diamond-like carbon film, a tin film, a chromium film, a nickel film, or a molybdenum film.

14. A hot-water supplying system or refrigeration and heating system for car air conditioners, an electric air conditioners for cars, a gas heat pump, an air conditioner, a refrigerator, a vending machine, or a showcase, comprising the composition according to claim 1.

15. The system according to claim 14, wherein a water content in the system is 300 ppm by mass or less and residual partial pressure in the system is 10 kPa or less.

16. A hot-water supplying system or refrigeration and heating system for car air conditioners, an electric air conditioners for cars, a gas heat pump, an air conditioner, a refrigerator, a vending machine, or a showcase, comprising the composition according to claim 14, wherein a water content in a system is 300 ppm by mass or less and a residual air partial pressure in the system is 10 kPa or less.

* * * * *